US009493294B2

(12) United States Patent
Nicklas et al.

(10) Patent No.: US 9,493,294 B2
(45) Date of Patent: Nov. 15, 2016

(54) VAPOR BARRIER FOR ELECTRODE PACKAGING

(75) Inventors: James Nicklas, Eastlake, OH (US); Lisa Byall, Rocky River, OH (US); Andrea Brighton, Westlake, OH (US)

(73) Assignee: Lincoln Global, Inc., City of Industry, CA (US)

( * ) Notice: Subject to any disclaimer, the term of this patent is extended or adjusted under 35 U.S.C. 154(b) by 1153 days.

(21) Appl. No.: 11/969,632

(22) Filed: Jan. 4, 2008

(65) Prior Publication Data

US 2009/0166234 A1 Jul. 2, 2009

Related U.S. Application Data

(60) Provisional application No. 61/018,058, filed on Dec. 31, 2007.

(51) Int. Cl.

*B65D 85/00* (2006.01)
*B65D 85/04* (2006.01)
*B32B 1/02* (2006.01)
*B32B 15/14* (2006.01)
*B32B 15/20* (2006.01)
*B65D 25/10* (2006.01)

(52) U.S. Cl.

CPC ................ *B65D 85/04* (2013.01); *B32B 1/02* (2013.01); *B32B 15/14* (2013.01); *B32B 15/20* (2013.01); *B65D 25/10* (2013.01)

(58) Field of Classification Search

CPC .................... B65D 85/04; B65D 25/10; B32B 15/14; B32B 1/02; B32B 15/20

USPC ....... 206/390, 395, 389, 443, 408, 409, 397, 206/524.2; 220/62.17, 62.19, 62.2, 62.21, 220/495.07, 495.09, 129, 629; 229/122.32, 229/122.34, 5.81, 5.82, 5.84, 117.27, 229/117.35, 122.21

See application file for complete search history.

(56) References Cited

U.S. PATENT DOCUMENTS

| | | | | |
|---|---|---|---|---|
| 1,640,368 | A * | 8/1927 | Obetz et al. | 206/409 |
| 1,865,688 | A * | 7/1932 | Hannaford | 62/371 |
| 2,310,712 | A | 2/1943 | Schmied | |
| 2,357,322 | A * | 9/1944 | Glocker | 215/364 |
| 3,419,138 | A | 12/1968 | Halsberghe | |
| 3,981,054 | A * | 9/1976 | Hull et al. | 27/17 |
| 4,850,506 | A * | 7/1989 | Heaps et al. | 229/117.3 |

(Continued)

FOREIGN PATENT DOCUMENTS

| | | |
|---|---|---|
| WO | 1 616 814 A1 | 1/2006 |
| WO | 2006/038238 A1 | 4/2006 |

OTHER PUBLICATIONS

Search Report for corresponding PCT International Application No. PCT/IB2008/003209, dated Apr. 6, 2009.

(Continued)

*Primary Examiner* — Anthony Stashick
*Assistant Examiner* — Ernesto Grano
(74) *Attorney, Agent, or Firm* — Hahn Loeser & Parks LLP

(57) ABSTRACT

A container is constructed for storing bulk material, and more specifically welding electrode, that incorporates layers of substantially dissimilar materials. A first layer of material provides rigidity to the container, while a second layer of material provides a vapor barrier for restricting moisture from entering the container. The container walls may be configured such that a vapor barrier is disposed between the rigid container walls.

13 Claims, 2 Drawing Sheets

36
20
21
25
35
28
28
12
30
12
36
32
32
32
22
36
14
36
22'
35

(56) References Cited

U.S. PATENT DOCUMENTS

| | | | | |
|---|---|---|---|---|
| 5,011,008 | A * | 4/1991 | Baker | 206/242 |
| 5,635,279 | A * | 6/1997 | Ma et al. | 428/174 |
| 6,007,246 | A * | 12/1999 | Kinigakis et al. | 383/204 |
| 6,102,239 | A * | 8/2000 | Wien | 220/495.07 |
| 6,237,768 | B1 * | 5/2001 | Cipriani | 206/408 |
| 6,481,575 | B2 * | 11/2002 | Cipriani | 206/408 |
| 6,648,141 | B2 * | 11/2003 | Land | 206/408 |
| 6,722,560 | B2 * | 4/2004 | Player et al. | 229/5.84 |
| 6,889,835 | B2 * | 5/2005 | Land | 206/408 |
| 6,913,145 | B2 * | 7/2005 | Barton et al. | 206/409 |
| 6,932,266 | B2 * | 8/2005 | Jones et al. | 229/199 |
| 7,198,152 | B2 * | 4/2007 | Barton et al. | 206/409 |
| 7,222,734 | B2 * | 5/2007 | Barton | 206/389 |
| 7,331,457 | B2 * | 2/2008 | Cipriani | 206/408 |
| 7,377,388 | B2 * | 5/2008 | Hsu et al. | 206/408 |
| 7,398,881 | B2 * | 7/2008 | Barton et al. | 206/408 |
| 2001/0006184 | A1 * | 7/2001 | Ohike et al. | 228/33 |
| 2003/0019776 | A1 | 1/2003 | Matsuguchi et al. | |
| 2003/0019778 | A1 * | 1/2003 | Moka | 206/505 |
| 2006/0057315 | A1 * | 3/2006 | De Coninck et al. | 428/34.2 |
| 2006/0196794 | A1 * | 9/2006 | Nicklas | 206/389 |
| 2007/0175786 | A1 * | 8/2007 | Nicklas | 206/395 |

OTHER PUBLICATIONS

The Squaring of the Circle literature reference of C.I.F.E., date of publication, PRE-2000.

* cited by examiner

VAPOR BARRIER FOR ELECTRODE PACKAGING

This utility patent application claims priority to U.S. provisional patent application Ser. No. 61/018,058 filed on Dec. 31, 2007.

TECHNICAL FIELD

The present invention pertains to packaging for welding electrodes, and more particularly, to containers that provide a moisture barrier for bulk electrode packaging.

BACKGROUND OF THE INVENTION

Welding electrodes are frequently stored in and dispensed from bulk packaging, such as boxes or drums constructed from heavy cardboard-like fibrous material. Bulk packaging reduces the time involved in changing over to a new source of welding electrode. In some cases as much as 1000 or 1500 pounds of welding wire can be stored in a single container. The drums enclose the welding electrode, i.e. welding wire, thereby limiting exposure to the elements. However the drums are usually not hermetically sealed. Accordingly the electrode stored inside is susceptible to the effects of moisture, which is known to degrade weld quality.

One problem encountered in FCAW is referred to as "gas marking", also known as "worm tracking", in which so-called gas marks or tracks appear as a series of depressions in the shape of a "worm" on the weld surface. Gas marking can be the result of gases being trapped under the slag as the weld solidifies. Voids or gas pockets in the weld metal, termed porosity, can also form leading to weld cracking. One factor that influences these effects is moisture in the flux core resulting from storage of the electrode in a damp environment.

What is needed is a container that includes a moisture barrier for restricting or inhibiting the amount of moisture resident within the confines of the container walls. The embodiments of the subject invention obviate aforementioned problems.

BRIEF SUMMARY

Embodiments of the present invention pertain to a container for storing associated bulk material, which may be flux-cored welding wire, that includes at least a first container wall having one or more container wall layers, wherein the at least a first container wall defines an interior region for storing the associated bulk material, and means disposed between the one or more container wall layers for substantially preventing moisture from penetrating the at least a first container wall.

In one aspect of the embodiments of the subject invention, said means comprises a vapor barrier disposed between the one or more container wall layers.

In another aspect of the embodiments of the subject invention, the vapor barrier is integrally fashioned with the at least a first container wall.

In yet another aspect of the embodiments of the subject invention, said means comprises a moisture restricting generally planar sheet incorporated into the at least a first container wall.

In still another aspect of the embodiments of the subject invention, the generally planar sheet is comprised of aluminum.

In even another aspect of the embodiments of the subject invention, the generally planar sheet is constructed from a polymer material.

In another aspect of the embodiments of the subject invention, the container includes multiple layers of moisture restricting or substantially moisture impervious generally planar sheets disposed between alternating layers of rigid or semi-rigid layers of material.

In still another aspect of the embodiments of the subject invention, the at least a first container wall includes at least a first sidewall and a bottom wall that defines a container having an open end. Additionally, the container includes a cover having one or more cover wall layers configured to enclose the open end of the container, wherein the cover is constructed with a vapor barrier disposed between the one or more cover wall layers.

In yet another aspect of the embodiments of the subject invention, the container includes a gasket dispose between the open end of the container and the cover.

In another aspect of the embodiments of the subject invention, the cover is constructed to include an aluminum sheet integrally fashioned with the one or more cover wall layers.

In another embodiment of the subject invention, a container for storing welding wire includes at least a first container wall defining an interior region for storing welding wire, wherein the at least a first container wall is constructed from two or more layers of material, and wherein at least two of the layers of material have substantially different hygroscopic properties.

In one aspect of the embodiment of the subject invention a container includes at least a first container wall that is constructed from two or more layers of conjoined material, and wherein a first layer of material comprises a vapor barrier for substantially preventing moisture from penetrating the at least a first container wall.

In another aspect of the embodiments of the subject invention, a second layer of material is substantially rigid for supporting the at least a first container wall.

In still another aspect of the embodiments of the subject invention, the second layer of material is comprised of cardboard-like material.

In yet another aspect of the embodiments of the subject invention, two or more layers of aluminum are disposed between multiple layers of fibrous material.

In even another aspect of the embodiments of the subject invention, the innermost layer of the two or more layers of material is comprised of a wear-resistant material.

DETAILED DESCRIPTION OF THE INVENTION

Figure 1:
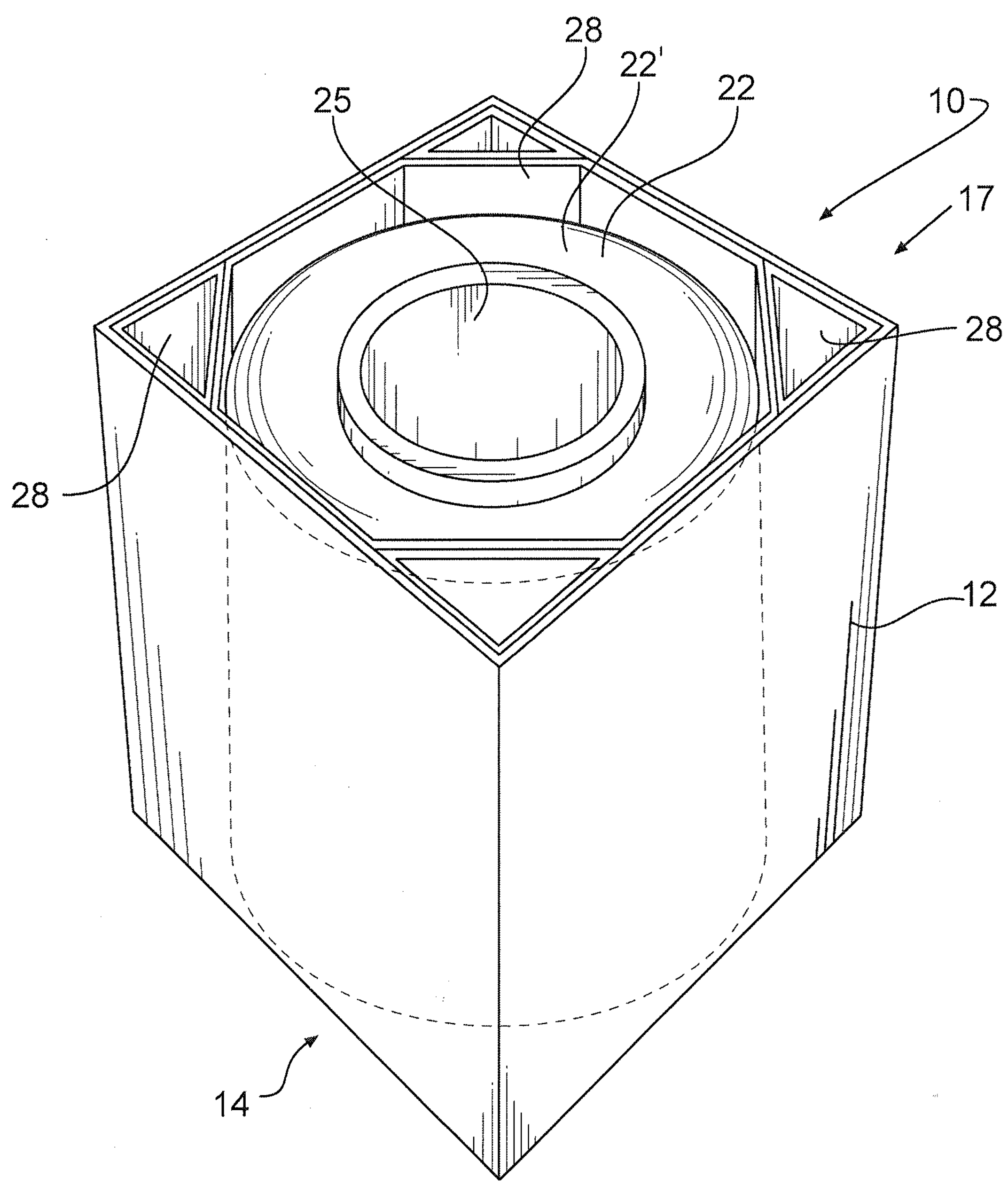
FIG. 1 is a perspective view of a container for storing welding electrode according to the embodiments of the subject invention.
Figure 2:
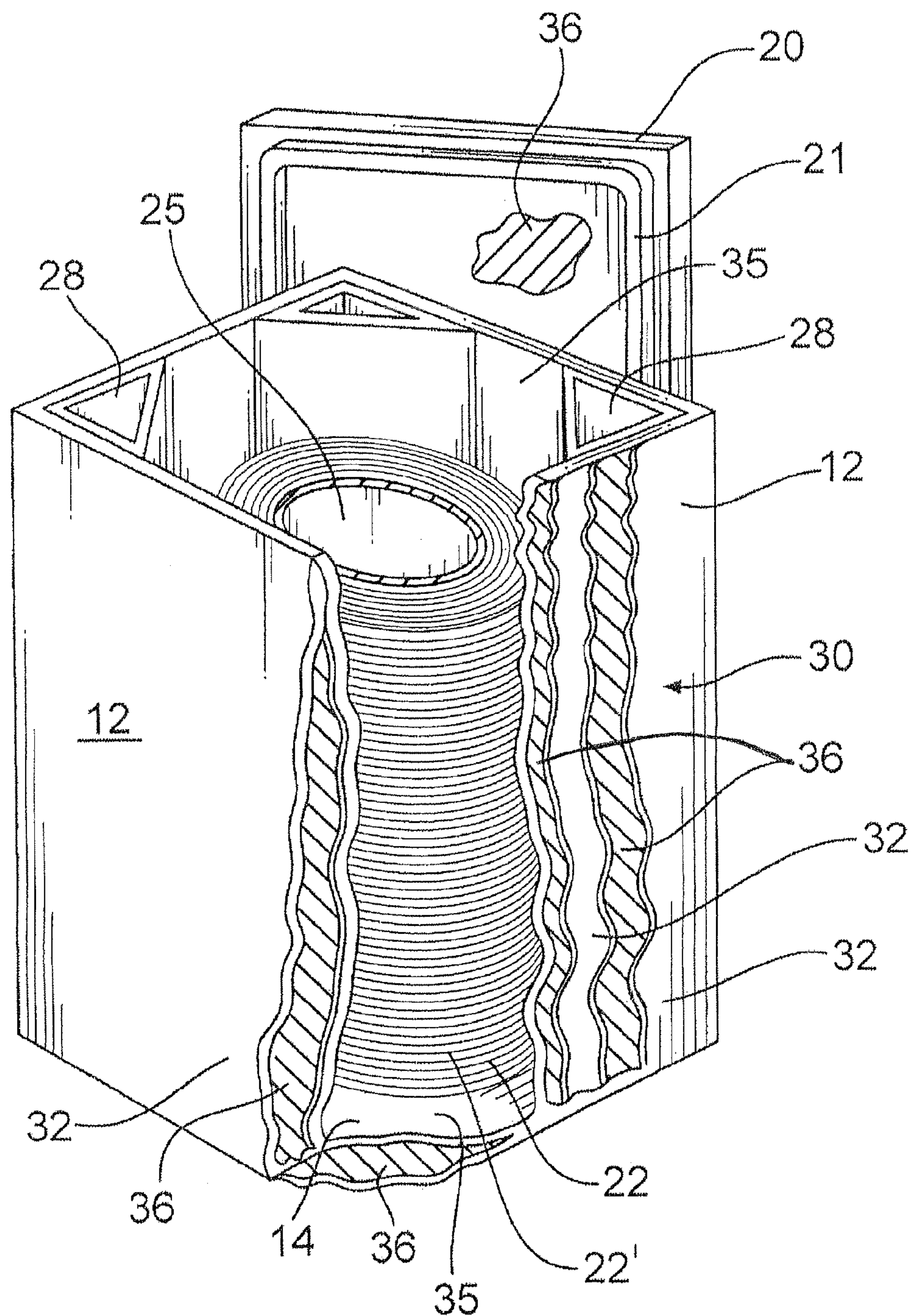
FIG. 2 is a partial cutaway perspective view of a container for storing welding electrode according to the embodiments of the subject invention.

Referring now to the drawings wherein the showings are for purposes of illustrating embodiments of the invention only and not for purposes of limiting the same, FIGS. 1 and 2 show a container for storing bulk material depicted at 10. The container 10 may be generally polygonal or circular in configuration having one or more side walls 12 terminating at a bottom panel or wall 14. The distal end 17 of the container may be open and configured to receive a lid or cover 20 for enclosing the contents of the container 10. The cross section of the container 10 may be rectangular. Although, the configuration described herein is not to be construed as limiting but rather exemplary in nature only. The wall members of the container 10 may be constructed from a fibrous material. One type of material may include paper-based material, like for example heavy cardboard, which may be sufficiently rigid when assembled to contain the contents stored therein. In one embodiment, the bulk material stored in the container 10 may be wire contiguously formed in a single strand. More specifically, the wire may be welding wire 22, also termed welding electrode 22', including but not limited to flux-cored wire and solid welding wire. The welding wire 22 may be deposited in the container 10 by continually stacking coils of the welding wire 22 around a central core 25. It will be appreciated that the welding wire 22 exerts a certain amount of force against the side walls 12 of the container 10. Accordingly, the material used to construct the container 10 will have sufficient strength to contain the bulk material during storage and/or transportation. Persons of ordinary skill in the art will readily understand the applications of the embodiments of the subject invention to numerous other types of bulk material.

With reference now to FIG. 1, as mentioned above the welding wire 22 may be coiled and placed in the container 10. To assist in the packing and storing of the welding wire 22, corner support members 28 may be included to maintain the bundled material in a generally cylindrical configuration. In one embodiment, the corner support members 28 may have a triangular cross section and may have a height corresponding to the height of the container 10. In this manner, the corner support members 28 function to constrain the circumference of the wire substantially along the entire height of the coil. It is noted that the corner support members 28 may be separate members inserted into the container 10. Alternatively, it is contemplated that the corner support members 28 may be integrally fashioned with the container 10. In this way, the container walls and/or the corner support members 28 define an interior region of the container 10 used to store the bulk material. It is to be construed that any configuration of the interior region may be chosen as is appropriate for use with the embodiments of the subject invention.

With reference to FIG. 2, the material used to construct the wall members of the container 10 may be fashioned from layered materials, illustrated generally at 30. In other words, the side walls 12 and/or the bottom wall 14 may be constructed from planar sheets of material 32 juxtaposed and assembled together to form a substantially unitary structure. The sheets of material 32 may be joined via an adhesive, although any means of joining the layers may be chosen with sound engineering judgment. In one embodiment, the wall members 12 and 14 may be constructed from one or more substantially dissimilar layers of material. For example, a first layer of material 35 may be comprised of a fibrous material such as heavy duty cardboard, mentioned above. A second dissimilar layer 36 of material may be comprised of a polymer or a metallic material. For purposes of illustration, the second dissimilar layer 36 of material may be aluminum or an aluminum alloy. However, it will be appreciated by persons of ordinary skill in the art that other combinations of materials may be utilized without departing from the intended scope of coverage of the embodiments of the subject invention. In this manner, one of the wall layers may be utilized for strength and rigidity, while another layer may function as a vapor barrier for substantially inhibiting or restricting moisture from passing through the container 10, and more specifically through the container side walls 12 and bottom wall 14. The bottom wall 14 may be particularly susceptible to moisture as the container 10 frequently rests directly on the ground or factory floor.

With continued reference to FIG. 2, the wall members, i.e. the side walls 12 and the bottom wall 14, of the container 10 may be constructed from a sheet of aluminum 36 sandwiched between two or more sheets of cardboard-like material 35. The relative thickness of the dissimilar layers may vary. In one embodiment, the thickness of each of the two or more sheets of cardboard-like material 35 may be substantially thicker than the sheet of aluminum. It follows that the thicker outer layers of the cardboard-like material provide strength for the container 10, while the thinner inner layer provides resistance from moisture passing into the interior region. It is to be construed that any thickness of the outer layers of material and any thickness of the sandwiched inner layer of material may be chosen as is appropriate for use with the embodiments of the subject invention. It is noteworthy to mentioned that the cardboard-like material provides sufficient structure and rigidity at a relatively low material cost. In a complementary manner, a relatively thin layer of aluminum provides a cost effective vapor barrier. Other cost-effective combinations of materials will become evident to persons of ordinary skill in the art and it is to be construed that all such embodiments fall within the scope of the appended claims. Another embodiment is contemplated wherein the bottom wall 14 may have a different thickness or different type of vapor barrier than the vapor barrier in the side walls 12. For example, the bottom wall 14 may include an aluminum sheet having twice the thickness than that of the side walls 12 or may even include an additional vapor barrier sheet, as will be discussed further below.

With reference once again to FIG. 2, it is contemplated in another embodiment that the container 10, more specifically the container wall members 12 and 14, may be constructed with multiple alternating layers of material 32. That is to say that multiple layers of vapor barrier sheets 36 may be interlaced between a plurality of more rigid layers of material 35 alternately disposed there between. It should be noted that any number and/or configuration of alternating layers of dissimilar materials may be chosen as is appropriate for use with the embodiments of the subject invention. Depending on the type of product stored in the container 10, it may be beneficial to construct the container 10 such that the innermost layer of material, i.e. that layer of material directly exposed to the welding wire 22, is made from a durable inner layer that resists wear or deterioration thereby preserving the integrity of the vapor barrier. In this manner, the innermost layer of material may be cardboard and/or any other cost effective material that resists wear.

With reference once again to FIG. 1, as described above, one end of the container 10 may be open for receiving welding wire 22. A cover 20 may be configured to match the open end of the container 10 for enclosing the container contents in a manner consistent with the embodiments described herein. The cover 20 may also be constructed with a vapor barrier similar to that of the side walls 12 and bottom wall 14 described above. Additionally, a gasket 21 may be incorporated between the cover 20 and the side walls 12 that comprise the open end of the container 10. The gasket 21 may be constructed from any resiliently deformable material suitable for sealing the interface between the cover 20 and the open end of the container 10. In one embodiment, the gasket 21 may be affixed with respect to the inside of the cover 20.

The invention has been described herein with reference to the disclosed embodiments. Obviously, modifications and alterations will occur to others upon a reading and understanding of this specification. It is intended to include all such modifications and alterations insofar as they come within the scope of the appended claims or the equivalence thereof.

What is claimed is:

1. A container for storing welding wire, said wire susceptible to the effects of moisture which degrades weld quality, comprising:

an inner rigid or semi-rigid fibrous container wall having a plurality of connected sides which define an interior region for storing welding wire;

an outer rigid or semi-rigid fibrous container wall having a plurality of connected sides;

at least one middle rigid or semi-rigid fibrous container wall between said inner and outer walls; and, at least two layers on opposed sides of said middle container wall, at least one of said at least two layers integrally fashioned with the outer wall and conjoined therewith for substantially preventing moisture or moisture vapor from penetrating into said container by forming a moisture barrier or moisture vapor barrier with said middle and outer container walls, said at least two layers for substantially preventing moisture or moisture vapor being selected from the group consisting of a planar sheet of polymer and a planar sheet of metallic material;

said at least two layers on opposed sides of said middle container wall reducing gas marking or worm tracking by reducing the amount of moisture or moisture vapor which ingresses through said container walls, thereby improving weld quality in comparison to a container without said at least two layers on opposed sides of said middle container wall.

2. The container as defined in claim 1, wherein at least one of said at least two layers is comprised of aluminum.

3. The container as defined in claim 1, further comprising:

multiple layers of at least one of said at least two layers disposed between alternating layers of rigid or semi-rigid layers of wall material.

4. The container as defined in claim 1, wherein the inner and outer container walls includes a bottom wall with an opposed open end; and further comprising:

a cover having one or more cover wall layers configured to enclose the open end of the container.

5. The container as defined in claim 4, further comprising:

a gasket for substantially sealing the interface between the open end of the container and the cover.

6. The container as defined in claim 4, wherein the cover is constructed to include an aluminum sheet integrally fashioned with the one or more cover wall layers.

7. A container for storing welding wire, comprising:

at least a first container wall defining an interior region for storing welding wire, wherein the at least a first container wall is constructed from two or more layers of rigid or semi-rigid fibrous material, and which further comprises:

at least two layers of integrally fashioned substantially moisture or moisture-impervious vapor barrier materials between an inner and outer layer of said two or more layers, at least one of said at least two layers integrally fashioned with the first container wall and conjoined therewith, each of said at least two layers having different hygroscopic vapor barrier properties and wherein said at least two layers are selected from the group consisting of a planar sheet of polymer and a planar sheet of metallic material;

said at least two layers of substantially moisture or moisture-impervious vapor barrier materials reducing gas marking or worm tracking by reducing the amount of moisture or moisture vapor which ingresses through said at least two layers, thereby improving weld quality in comparison to a container without said at least two layers.

8. The container as defined in claim 7, wherein the at least a first container wall is constructed from three or more layers; and, wherein said at least two layers are positioned on opposed sides of a middle layer of rigid or semi-rigid fibrous material of said three or more layers.

9. The container as defined in claim 8, wherein the rigid or semi-rigid material is comprised of cardboard-like material.

10. The container as defined in claim 9, wherein the substantially moisture or moisture-impervious vapor barrier is a generally planar aluminum sheet.

11. The container as defined in claim 7, wherein:

said two or more layers are aluminum sheets disposed between layers of fibrous material.

12. The container as defined in claim 7, wherein an innermost layer of the two or more layers of material is comprised of a wear-resistant material.

13. A container for storing welding wire which comprises:

at least a first container wall that includes at least a first sidewall and a bottom wall that defines a container having an open end, wherein said at least a first sidewall comprises at least three layers of rigid or semi-rigid fibrous material, an exterior wall, an interior wall and a middle wall, and further wherein said at least two moisture or vapor barrier layers are positioned on opposed sides of said middle layer of said rigid or semi-rigid material and wherein said moisture or vapor barrier layer exterior of said middle layer is conjoined and integrally fashioned with said exterior wall, therewith rendering said middle layer substantially moisture or moisture impervious;

a cover; and, wherein each of the at least a first sidewall, the bottom wall and the cover include at least two moisture or vapor barrier layers of material selected from the group consisting of a planar sheet of aluminum and a planar sheet of polymer material;

said substantially moisture or moisture-impervious vapor barrier middle container wall reducing gas marking or worm tracking by reducing the amount of moisture vapor which ingresses through said container walls, thereby improving weld quality in comparison to a container without said substantially moisture barrier or moisture-impervious vapor barrier middle container walls.

* * * * *